3,009,859
POTASSIUM ASPARTATE AND MAGNESIUM ASPARTATE FATIGUE-RECOVERY PROMOTING PROCESS AND COMPOSITIONS

Henri Laborit, 26 Rue Brillat-Savarin; Georges Guiot, 34 Rue Gay-Lussac; Raymond Moynier, 18 Rue Saint-Romain; and Claire Baron, 18 Rue Edmond Flament, all of Paris, France, and André Trzebski, Wilcza 33 M. 9, Warsaw, Poland
No Drawing. Filed July 22, 1958, Ser. No. 755,118
9 Claims. (Cl. 167—65)

This invention relates to novel compositions of matter which have been found to possess valuable pharmaceutical properties as anti-fatigue drugs.

Compositions according to the invention essentially comprise soluble salts of aspartic acid, preferably though not necessarily in combination with adenosine triphosphate.

Aspartic acid, otherwise known as amino-succinic acid, has been known for around twenty years as being one of the non-essential aminoacids derivable, for example, from sugar cane and beet root molasses. However, the literature shows that no particular physiological or therapeutic action of any character whatever has been ascribed either to the said acid itself or to any of its salts.

It has now been discovered that salts of aspartic acid when given to test subjects having undergone severe and prolonged physical stress have the unexpected property of opposing fatigue. This action is manifested both in that the subjects succumb to fatigue after more time, and that after a very brief rest period the treated subjects are able to resume physical exertion.

This remarkable property is especially marked with the aspartates of alkali and alkali-earth metals, and is a maximum with potassium aspartate and magnesium aspartate.

The novel anti-fatigue compositions of the invention may be administered in solid form or in solution.

It has further been discovered that on addition to the above-specified aspartates of a low proportion of adenosine triphosphate which is an enzyme completely devoid of any anti-fatigue activity per se, a high synergic effect is obtained with the aspartate and the resulting composition has markedly increased anti-fatigue properties. The invention, accordingly, includes anti-fatigue compositions comprising at least one aspartate and a low proportion of adenosine triphosphate therein.

When an aspartate is used in an aqueous solution according to the invention, the salt concentration may be about 10%, and an amount of adenosine triphosphate may be added thereto of about from 1 to 5 per mil by weight.

The anti-fatigue properties of the novel compositions have been ested by using the conventional rat swimming test.

A male rat of the Wistar variety, average weight about 250 grams, was placed in a smooth-walled tank 90 cm. long, 55 cm. wide and 60 cm. deep, containing a sufficient amount of water to prevent the rat from obtaining relief by touching the bottom with its tail. In order to force the rat to swim continually throughout the test the water in the tank was agitated by means of a tube discharging air into the bottom of the tank at a controlled uniform rate. The water temperature was maintained between 28 and 30° C. The rat is considered exhausted when it sinks and cannot again rise to the surface. It is then withdrawn from the tank, dried and put back in its cage. It is taken out for a new test 2½ hours later. The duration of the second test gives a measure of the degree of recovery. It was ascertained on 8 animals that the first test does not provide swimming practice for the rat.

Batches of from 13 to 20 rats were variously subjected to potassium aspartate (applied the day before and an hour before the test, respectively), magnesium aspartate, and the combination potassium asparate + adenosine triphosphate, all as described in greater detail presently.

The test results are summarized in Table I.

Table I

| Conditioning treatment | Duration (minutes) | |
|---|---|---|
| | 1st test | 2nd test |
| Rats treated with potassium asparate: | | |
|   The day before | 122 | 152 |
|   1 hour before | 111 | 117 |
| Rats treated with magnesium asparatate | 120 | 114 |
| Rats treated with potassium aspartate+magnesium aspartate+adenosine triphosphate | 166 | 140 |

The conditioning treatments were performed as follows:

*Potassium aspartate treatment.*—5 cc. of a 2.5% solution of potassium aspartate, corresponding to the amount of $K^+$ ions given in the KCl treatment, were given by gastric tube, the day before the test between 4 and 5 p.m. in one experiment, and one hour before the test in another experiment involving six animals. As shown in Table I, the first experiment gave more conclusive results.

*Magnesium aspartate treatment.*—5 cc. of a 2.5% solution was given by probang at 5 p.m. the day before the test.

*Treatment with potassium and magnesium aspartate and A.T.P.*—The aspartic acid salts and the A.T.P. were combined in the form of tablets containing 250 mg. potassium aspartate, 250 mg. magnesium aspartate and 2 mg. A.T.P. The tablet was ground and dissolved in 5 cc. distilled water and given by gastric tube the day before the test.

Tests on human subjects have also been carried out at the military physical training center of Joinville, France. There is no known test applicable to human subjects capable of yielding anything but a qualitative evaluation of fatigue. However, even though the test results are evidenced as subjective sensations, they are of undisputable objective value since they were unanimously elicited from 120 different subjects. The following tests were made:

*Magnesium aspartate.*—Five 0.30 mg. tablets per 24 hours. Moderately good over-all results were obtained when applied to overtrained boxers and to middle-distance runners in poor physical condition. After 24 hours of the treatment the subjects said they felt well, although performance remained poor.

*Potassium aspartate.*—A similar dose was given for 3 days to bicycle road racers. The subjects said they felt greater ease during exertion, greater well-being without abnormal euphoria, a fullness of their physical powers and improved recovery after effort.

*Potassium aspartate and adenosine triphosphate.*—This composition was given in a dose of 1–6 daily 250 mg. aspartate and 6 mg. adenosine triphosphate tablets. When given to subjects in good physical condition, the subjects felt relaxed prior to exertion, there was no sudden exhaustion or cramp. Above all there was extremely rapid recovery after exertion, no sense of tiredness or stiffness the next day.

In overworked and convalescent subjects there was a sense of well-being and of return to good physical condition.

One extremely important field of application of the new anti-fatigue compositions is in the treatment of those ailments which, though not obviously due to fatigue, are nevertheless evidence of a fatigued or exhausted condition of certain cells. Thus, compositions according to the invention are beneficial in the treatment of liver deficiency of both primary and secondary character, and the sequelae or splanchic vasomotor disturbance, e.g. due to shock from injury or severe burns, states of respiratory deficiency, myocardic infarctus, and other states.

What I claim is:

1. A recovery-promoting anti-fatigue composition consisting essentially of a combination of potassium aspartate and magnesium aspartate.

2. A composition according to claim 1, in which the potassium aspartate and magnesium aspartate are in solid form.

3. A composition according to claim 1, in which the potassium aspartate and magnesium aspartate are in aqueous solution.

4. A composition according to claim 1 which contains adenosine triphosphate within the range of from about 1 to 5 parts by weight per 1,000 parts by weight of said combined potassium and magnesium aspartates.

5. A composition according to claim 1 in the form of an aqueous solution of which the potassium aspartate and the magnesium aspartate each constitutes about 5% by weight and the adenosine triphosphate constitutes about 0.02% by weight.

6. The method of promoting recovery from fatigue in animals and humans which comprises administering to such animals and humans a composition, the essential recovery-promoting components of which are potassium aspartate and magnesium aspartate.

7. The method of promoting recovery from fatigue in animals and humans having undergone severe and sustained physical stress which comprises administering to such animals and humans a composition, the essential recovery-promoting components of which are potassium aspartate and magnesium aspartate.

8. The method of promoting recovery from fatigue in animals and humans which comprises administering to such animals and humans a composition, the essential recovery-promoting component of which is potassium aspartate.

9. The method of promoting recovery from fatigue in animals and humans which comprises administering to such animals and humans a composition, the essential recovery-promoting component of which is magnesium aspartate.

References Cited in the file of this patent

Terner: Biochemical J., vol. 47, 1950, pp. 139–148.

Lesser: Drug and Cosmetic Ind., vol. 70, No. 4, April 1952, pp. 476–477, 544–549.